Patented Sept. 23, 1952

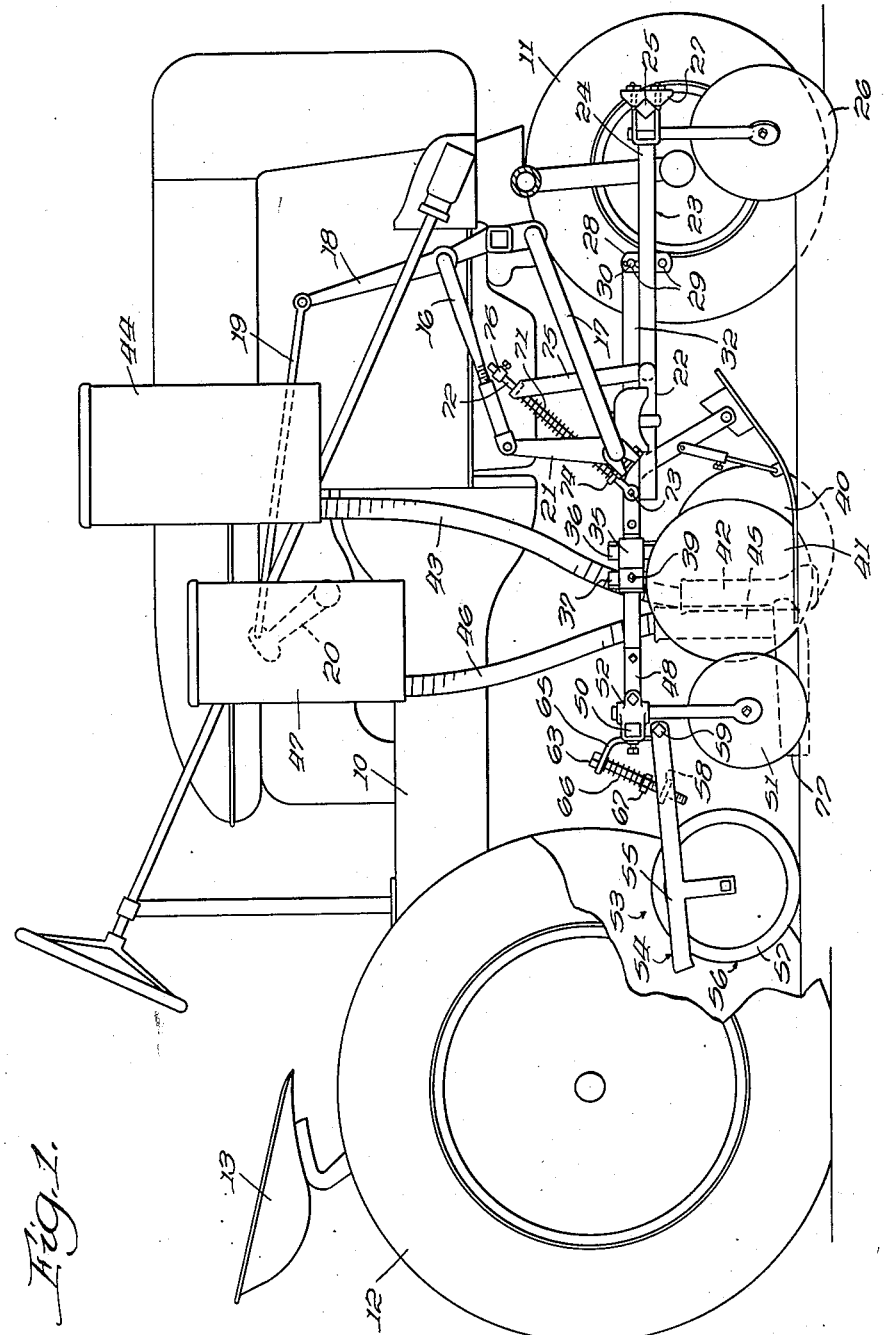

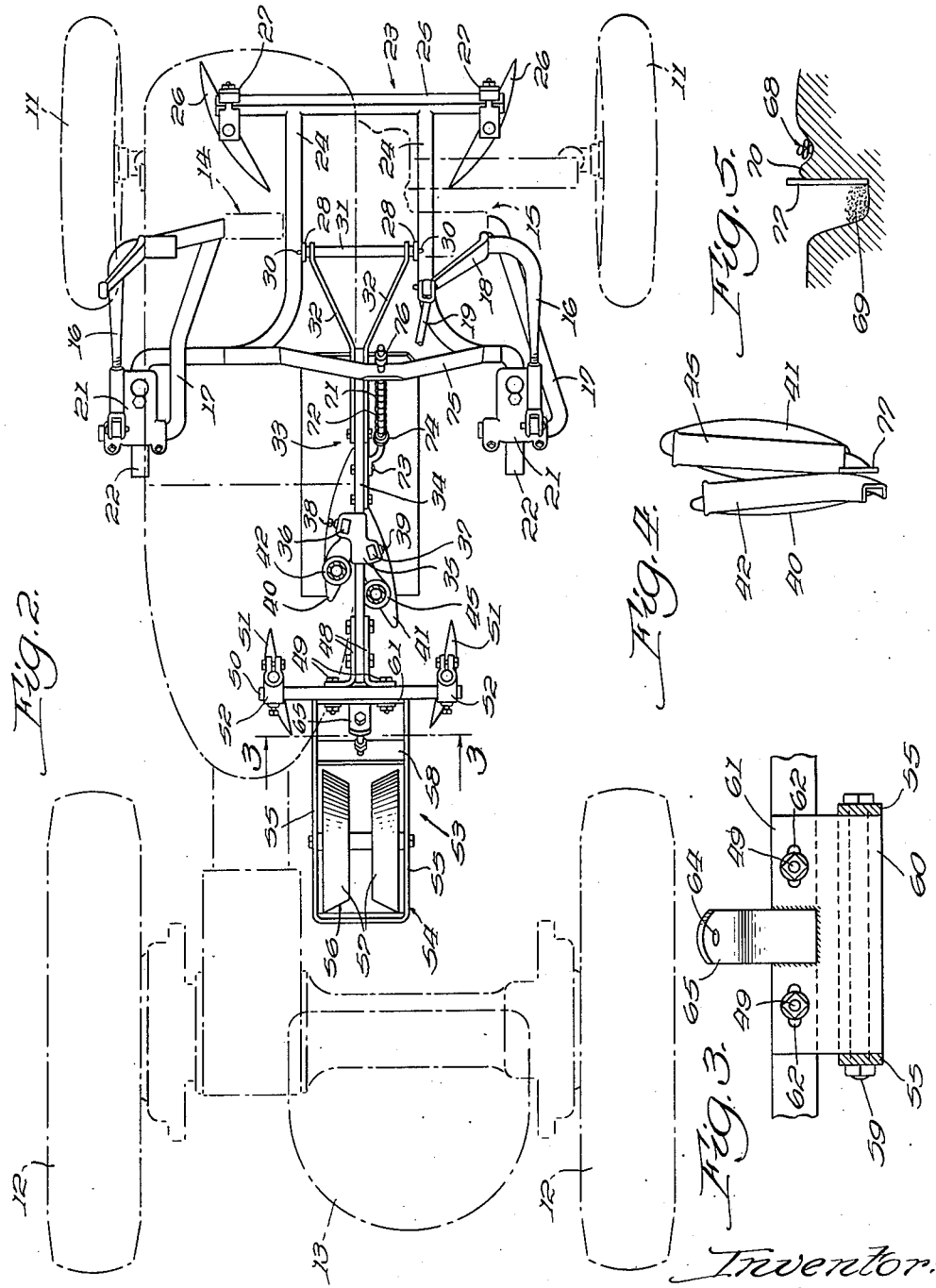

2,611,331

UNITED STATES PATENT OFFICE 2,611,331

PLANTER

Gordon R. O'Neil, Canton, Ill., assignor to International Harvester Company, a corporation of New Jersey Application April 3, 1946, Serial No. 659,368

3 Claims. (Cl. 111—73)

This invention relates to agricultural implements and particularly to planters.

In planting seed such as cotton, it is common practice to deposit fertilizer alongside the seed but at a lower depth by mounting the fertilizer furrow opener of the planter on a lower level than the seed furrow opener. The furrow openers are laterally separated and a balk or wall of dirt is formed therebetween to avoid a mixture of seed with the fertilizer with the attendant injury to the seed. The furrow opener assembly generally comprises a pair of disks spaced sufficiently to provide a ridge of dirt therebetween, and having associated therewith seed and fertilizer dispenser boots through which this material is deposited in the furrows formed by the openers. In many soil conditions this arrangement is satisfactory, but when loose dry soil is encountered the ridge of dirt formed between the disks has a tendency to break away before the deposited material is covered by the following covering disks or the like. The present invention is designed to overcome this obstacle and has for its principal object the provision of an improved planter wherein means are provided for depositing fertilizer alongside the seed.

Another object of the invention is to provide in a planter having furrow openers and mechanism for depositing seed and fertilizer in adjacent rows as well as covering devices for throwing earth over the deposited material, means for maintaining a balk or wall of earth between the rows of seed and fertilizer until the material has been covered.

Another object of the invention is to provide in a planter having a pair of furrow openers and dispensing mechanism for depositing seed and fertilizer in adjacent furrows, a shield or guard in the form of a runner blade between and extending rearwardly from the furrow openers to maintain a ridge of earth between the adjacent furrows and prevent mixture of seed and fertilizer.

A further object is to provide to the rear of the furrow openers a press wheel which is laterally adjustable with respect to the furrow openers to center the wheel over the seed and fertilizer furrows.

Other objects and advantages will become clear from the following detailed description when read in conjunction with the accompanying drawings, wherein:

Figure 1 is a view in side elevation of a tractor showing a planter embodying the features of the present invention mounted thereupon.

Figure 2 is a plan view of the structure shown in Figure 1.

Figure 3 is a detail of the structure by which the press wheel is attached to the planter frame.

Figure 4 is an elevation of the furrow opener disks showing the seed and fertilizer boots associated therewith, and Figure 5 is a sectional view of the furrows formed by the furrow openers and showing the mechanism by which the furrow wall is prevented from collapsing.

In the drawings, a planter embodying the features of the present invention is shown mounted upon a tractor having a laterally offset body 10, front wheels 11, rear drive wheels 12, and an operator's seat 13. At the forward end of the tractor and at opposite sides thereof are provided attaching structures 14 and 15 serving for the mounting upon the tractor of vertically spaced generally parallel links 16 and 17 and for a rock arm 18 which is secured to the upper parallel link 16 and is connected by a connecting rod 19 to a rock arm 20 rocked by any suitable means deriving power preferably from the tractor power plant. The rearwardly extending ends of each of the pairs of parallel links 16 and 17 are connected pivotally to a vertically extending bracket 21. To the base portion of each of these brackets 21 are secured the longitudinally extending legs 22 of a frame structure generally indicated at 23. The legs 22 are bent inwardly and provided with laterally spaced extensions 24 which extend forwardly and are connected at their forward ends by a transverse bar 25, at the opposite ends of which are provided hilling disks 26 secured to the bar by brackets 27. It will thus be seen that by virtue of the connection of the parallel links 16 and 17 on opposite sides of the tractor to the frame 23, this frame is vertically movable with respect to the tractor through operation of the rock arm 20.

Secured as by welding to the inner surfaces of each of the arm portions 24 are vertically extending lugs 28 having a plurality of openings 29 therein which serve for the reception of the ends of a transverse shaft 30 upon which is mounted a sleeve 31. Secured to the ends of the sleeve 31 are rearwardly converging straps 32 which form part of the main planter frame generally indicated at 33 and having secured between the rear ends thereof a longitudinally extending beam 34. Beam 34 has mounted thereupon a bracket 35 having openings therein for the reception of vertically extending standards 36 and 37 which are held in adjusted position by set screws 38 and 39, respectively. Mounted upon the lower ends of the standards 36 and 37 are, respectively, furrow opener disks 40 and 41, disk 40 being mounted somewhat lower than and forwardly of disk 41, as clearly shown in Figure 1. Associated with the disk 40 and secured to the standard 36 is a fertilizer boot 42. Boot 42 serves for the deposition of fertilizer in the furrow formed by the disk 40. Fertilizer is delivered to the boot 42 through a flexible tube 43 from a receptacle 44 suitably mounted upon the side of the tractor. Secured to the standard 37 and associated with disk 41 is a seed boot 45 from which seed is deposited in the furrow formed by the disk 41. Seed is delivered to the boot 45 through a flexible tube 46 from a receptacle 47 suitably mounted upon the side of the tractor. It will thus be seen that the fertilizer is deposited at a lower level than the seed and in a furrow laterally spaced from the seed furrow.

Secured to the opposite sides of beam 34 at the rear thereof are angle bars 48 which have their ends bent outwardly and apertured to receive bolts 49 by which a transverse tool bar 50 is secured to the straps 48. The ends of tool bar 50 are provided with laterally spaced covering disks 51 attached to the tool bar 50 by means of brackets 52. At the rear of the frame 33 is provided a press wheel assembly generally indicated at 53 and including a carrier frame 54 with side arms 55 having mounted therebetween a press wheel 56 comprising laterally spaced frustroconical wheel sections 57. The arms 55 extend forwardly and are braced by a cross member 58. The forward ends of the arms 55 are apertured to receive therebetween a transversely extending bolt 59 mounted in the bearing portion 60 of an attaching plate 61. The carrier 54 thus has vertical pivotal movement with respect to the attaching plate 61. Attaching plate 61 is secured to the transverse tool bar 50 by means of the bolts 49 and is provided with slots 62 for the reception of the bolts 49, whereby the attaching plate 61 and the press wheel assembly 53 can be laterally moved bodily with respect to the furrow openers 40 and 41. Vertical swinging movement of the press wheel assembly with respect to the tool beam 34 and the furrow opener disks 40 and 41 is limited by means of a bolt 63 received in an aperture 64 in a rearwardly bent lug 65 secured to the attaching plate 61. Bolt 63 is threaded at its lower end for reception in a threaded opening in the cross piece 58. The upper portion of the shank of the bolt 63 is slidably received in the aperture 64 and is surrounded by a spring 66 which abuts the lug 65 at its upper end and a nut 67 at its lower end. Nut 67 is threaded upon the lower portion of the bolt and permits adjusting the tension upon the spring 66.

From consideration of Figure 5 it will be evident that the seed indicated at 68 and the fertilizer indicated at 69 are placed in separate furrows with the fertilizer lower than the seed, and that the two rows of material are separated by a ridge or wall of earth 70. During the travel of the planter unit the seed and the fertilizer are covered by dirt directed inwardly by the covering disks 51 mounted rearwardly of the furrow openers. These disks direct soil inwardly from opposite sides to cover the seed and fertilizer. Subsequently the planter bed is pressed or compacted by the press wheel 56. As pointed out before, the forward ends of the straps 32 forming a part of the planter frame 33 are pivotally mounted upon the transverse shaft 30 so that the planter unit may rise and fall about the pivotal connection of the shaft 30 to the lugs 28 with respect to the tractor and with respect to the hilling disks 26. Upward movement of the frame 33 about its pivot is resiliently restrained by a spring 71 surrounding a rod 72, the lower end of which is connected by a bolt 73 to the tool beam 34. The lower end of the spring 71 abuts against a collar 74 upon the lower end of the rod 72, and the upper end thereof abuts against the bight portion of a yoke 75 apertured for the sliding reception of the upper portion of the rod 72. Yoke 75 has downwardly diverging arms secured to the frame 23. The upper end of the rod 72 has adjustably secured thereto a collar 76 by which the sliding movement of rod 72 in one direction is limited. By this arrangement the entire planter unit may be lifted through the parallel links 16 and 17.

It has previously been pointed out that in many types of soil, particularly loose dry soil, the wall formed between the furrows opened by the disks 40 and 41 will tend to crumble upon the passage of the furrow openers therethrough and to cause intermingling of the seeds with the fertilizer. In order to avoid this eventuality applicant has provided an elongated vertically extending blade member 77 clearly shown in Figures 1, 4, and 5. The forward portion of this blade member 77 is secured by any suitable means between the lower portions of the seed and fertilizer boots 42 and 45. The blade 77 extends rearwardly therefrom to a position between the covering disks 51 and occupies a position against the wall 70 separating the seeds and the fertilizer in a manner indicated clearly in Figure 5. Thus the wall 70 is preserved substantially intact and held against crumbling from the time the seed and fertilizer are deposited in their respective furrows until the furrows are covered by soil thrown inwardly by the covering disks 51. Once the seed and fertilizer are covered by a layer of soil the danger of their becoming intermingled is eliminated.

The press wheel 56 is arranged directly behind the furrow openers and should be exactly centered with respect to the seed and fertilizer furrows in order that they may be properly compacted thereby. Likewise, variations sometimes occur in the position of the furrow opener disks with respect to the tool beam upon which they are mounted, and it is important that the press wheel be adjustable laterally to compensate for any variations in manufacture or installation of the furrow opening equipment. For this reason the slots 62 are provided in the plate 61 by which the press wheel assembly is secured to the tool bar 50 so that by merely loosening the bolts 49 the press wheel assembly may be bodily moved to left or right.

It is believed that the operation of the planter of the present invention will be thoroughly understood from the foregoing description. It should likewise be clear that modifications may be made in the planter of the present invention without departing from the spirit of the invention or the scope of the appended claims.

What is claimed is:

1. In a planter, a frame, a pair of laterally spaced furrow openers mounted on said frame and arranged to open parallel furrows in the earth with a separating wall of earth between the furrows, a material dispenser boot supported from said frame and associated with each said furrow opener for depositing material in the furrow formed thereby, laterally spaced covering devices mounted on said frame and arranged rearwardly of said furrow openers for directing earth inwardly toward said furrows to cover the material deposited therein, and an upright blade secured to one of said dispenser boots and extending rearwardly therefrom to a location between said covering devices, said blade being positioned in one of said furrows and arranged to bear against said separating wall to maintain the wall between said furrows unimpaired until the latter have been covered by said covering devices.

2. In a planter, a frame, a pair of vertically offset furrow openers mounted on said frame and arranged to open parallel contiguous furrows in the earth at different depths with a separating wall of earth between the furrows, means associated with each said furrow opener for depositing material in the furrow formed thereby, laterally spaced covering devices mounted on said frame and arranged rearwardly of said furrow openers for directing earth inwardly toward said furrows to cover the material deposited therein, and an upright elongated blade supported from said frame between said furrow openers and extending rearwardly therefrom to a location between said covering devices, said blade being positioned in the deeper of said furrows and arranged to bear against said separating wall to prevent the collapse thereof until the material in the furrows has been covered by earth thrown thereon by the covering devices.

3. In a planter, a frame, a pair of laterally spaced furrow opener disks mounted on the frame in vertically offset relation whereby the furrow opened by one disk is deeper than the other, the spacing between said disks being sufficient to form separate furrows with a separating wall of earth therebetween, laterally spaced covering devices mounted on the frame rearwardly of the disks arranged to direct earth inwardly to cover the furrows, dispensing mechanism associated with each said disk for depositing material in each furrow, and a blade member arranged to travel in the deeper furrow and bear against the separating wall to prevent collapse thereof, said blade member being secured between the disks and extending rearwardly to a location between said covering devices.

GORDON R. O'NEIL.

REFERENCES CITED

The following references are of record in the file of this patent:

UNITED STATES PATENTS

| Number | Name | Date |
| --- | --- | --- |
| 312,791 | Arnett | Feb. 24, 1885 |
| 405,477 | Holt | June 18, 1889 |
| 1,229,195 | Patric | June 5, 1917 |
| 1,281,873 | Swiggart | Oct. 15, 1918 |
| 1,317,402 | Taylor | Sept. 30, 1919 |
| 1,633,388 | Silver | June 21, 1927 |
| 1,837,895 | Chambers | Dec. 22, 1931 |
| 1,857,749 | White | May 10, 1932 |
| 2,297,384 | Benjamin | Sept. 29, 1942 |
| 2,357,760 | Peacock | Sept. 5, 1944 |
| 2,361,100 | Hipple | Oct. 24, 1944 |
| 2,364,958 | Drennan | Dec. 12, 1944 |
| 2,376,559 | Smith | May 22, 1945 |
| 2,417,931 | Hipple | Mar. 25, 1947 |